(12) United States Patent
Reix et al.

(10) Patent No.: US 12,138,968 B2
(45) Date of Patent: Nov. 12, 2024

(54) BEAD CORE FOR AGRICULTURAL TIRE

(71) Applicant: COMPAGNIE GENERALE DES ETABLISSEMENTS MICHELIN, Clermont-Ferrand (FR)

(72) Inventors: Olivier Reix, Clermont-Ferrand (FR); Florian Lachal, Clermont-Ferrand (FR); Stephane Quenard, Clermont-Ferrand (FR)

(73) Assignee: COMPAGNIE GENERALE DE ETABLISSEMENTS MICHELIN, Clermont-Ferrand (FR)

( * ) Notice: Subject to any disclaimer, the term of this patent is extended or adjusted under 35 U.S.C. 154(b) by 200 days.

(21) Appl. No.: 17/639,188

(22) PCT Filed: Jul. 27, 2020

(86) PCT No.: PCT/FR2020/051371
§ 371 (c)(1),
(2) Date: Feb. 28, 2022

(87) PCT Pub. No.: WO2021/038149
PCT Pub. Date: Mar. 4, 2021

(65) Prior Publication Data
US 2022/0324269 A1 Oct. 13, 2022

(30) Foreign Application Priority Data
Aug. 29, 2019 (FR) ........................................ 1909490

(51) Int. Cl.
*B60C 15/04* (2006.01)
(52) U.S. Cl.
CPC ........ *B60C 15/04* (2013.01); *B60C 2015/048* (2013.01); *B60C 2200/08* (2013.01)

(58) Field of Classification Search
CPC .............. B60C 15/04; B60C 2015/042; B60C 2015/044; B60C 2015/046; B60C 2015/048
See application file for complete search history.

(56) References Cited

U.S. PATENT DOCUMENTS 4,561,919 A * 12/1985 Forsyth ................... B60C 15/04
156/422
5,511,600 A 4/1996 Glotzbach
2008/0196812 A1 8/2008 Turvey et al.

FOREIGN PATENT DOCUMENTS

EP 0615867 A1 9/1994
JP 3-5218 A 1/1991
(Continued)

OTHER PUBLICATIONS

Machine translation of JP 07156617, 1995.*
International Search Report dated Sep. 18, 2020, in corresponding PCT/FR2020/051371 (4 pages).

*Primary Examiner* — Justin R Fischer
(74) *Attorney, Agent, or Firm* — VENABLE LLP

(57) ABSTRACT

A bead core for a tire, which is substantially rotationally symmetrical about an axis, comprises a plurality of windings of at least one metallic wire with diameter d arranged next to one another in a direction P forming an angle α with the axial direction in a radial sectional half-plane R, on N layers superposed on one another in the radial direction, wherein: α ranges from 0° to 10°; in the sectional half-plane R, the windings form a structure consisting of a base structure and a cap structure, wherein the radially inner base structure in the shape of a parallelogram is directly in contact in the radial direction with the radially outer cap structure in the shape of a trapezium. The product of the diameter d times the number of windings L ranges from 13.0 mm to 25.0 mm, and N is less than or equal to 16.

14 Claims, 10 Drawing Sheets

(56) References Cited

FOREIGN PATENT DOCUMENTS

JP 07156617 A * 6/1995
JP 2018-103968 * 7/2018

* cited by examiner

BEAD CORE FOR AGRICULTURAL TIRE

BACKGROUND

The invention concerns a bead core for a tyre, the method of production of the bead core, and a tyre comprising this bead core.

The invention will be described more particularly with reference to a tyre for agricultural or forestry vehicles.

A tyre for agricultural vehicles sold under the MICHELIN brand and belonging to the AxioBib range is known from the prior art, said tyre having the following dimensional characteristics: 600/70 R30. Such a tyre comprises a crown with a crown reinforcement topped with a tread. Two sidewalls extend the crown radially inwards. The tyre comprises two beads radially inside the sidewalls, each comprising an annular reinforcing structure. The annular reinforcing structure comprises a bead which is substantially rotationally symmetrical about an axis and comprises several windings of at least one wire, arranged axially next to one another over several layers which are radially superposed on one another. The wire has a substantially circular cross-section. Such a bead core is generally known as a TPC (square bead core packet). It has a square base and is composed of 72 wires of diameter 1.30 mm. The bead core of the prior art may be bare or coated with a packing rubber.

The tyre also comprises a radial carcass reinforcement which extends from the beads through the sidewalls as far as the crown. The carcass reinforcement comprises one or more carcass plies, at least one of these carcass plies being anchored in each of the beads. The TPC square bead core is adapted to the process without wrapping of the carcass ply or plies around the bead. In this method, the sidewalls are folded up mechanically to anchor the carcass ply.

In the case of manufacturing machines using a method with rotating bead, wrapping of the carcass ply or plies around the bead or its coating is necessary so as to form, in each bead, an outgoing strand extending radially between each bead through the sidewalls and the crown, and an incoming strand extending radially from each bead through each sidewall.

During production of the tyre by this method with rotation of the bead, which is performed for example on an assembly drum, the bead core is laid on the carcass ply and the incoming strand is folded back around the bead core. Then the carcass ply and bead are turned relative to one another. With the bead core of the prior art, this rotation is difficult because of the square form of the TPC bead core. It is then necessary to apply a large quantity of packing rubber to allow rotation of the carcass ply or plies around the bead core. However in operation, this large quantity of packing rubber degrades the thermal performance of the bottom zone and hence the endurance performance of the tyre, which is not desirable.

Bead cores for tyres for agricultural vehicles sold under the MICHELIN brand and belonging to the AxioBib range are also known from the prior art, having the following dimensional characteristics: 600/70 R42. Such bead cores are generally known as TPFR-H (round wire bead core packet) with hexagonal base and are composed of 42 wires of 1.55 mm diameter.

Because of their hexagonal shape, in the production method with bead rotation, these bead cores allow one or more carcass plies to wind around the bead core. However, during curing of the tyre in the prior art, there is a significant rotation of the bead core about its axis relative to the rest of the tyre, in particular relative to the carcass ply or plies.

The strong tensions applied to the carcass ply or plies during curing of the tyre cause an over-tensioning of the strands of the carcass ply or plies. The bead core is then exposed to high torsion levels which lead to its rotation, as illustrated in FIG. 3. Under the effect of the over-tensioning of the strands of the carcass ply or plies, the windings of the bead core, in particular the windings in contact with the strands of the over-tensioned carcass ply or plies, become disorganised, leading to disorganisation of the geometry of the TPFR-H.

Rotation of the bead core during curing of the tyre is extremely disadvantageous since it greatly reduces the clamping pressure on the rim, in particular on the seat of the rim, causing a reduction in clamping pressure on the rim and shrinkage of the surface of clamping on the rim.

The first effect of a reduction in clamping pressure is a reduction in the performance in rotation on the rim under the effect of the motive force. The second effect, in particular in the case of high-power vehicles, is an increase in the friction of the tyre against the rim, which leads to a degradation of the bead and can cause breakage of the carcass ply or plies in contact with the rim. When these potential problems occur, they lead to prohibitive loss of performance in terms of tyre endurance.

The object of the invention is to provide a bead core allowing wrapping of the carcass ply or plies around the bead core, without however allowing significant rotation of the bead core during curing of the tyre.

SUMMARY

To this end, the invention concerns a bead core for a tyre which is substantially rotationally symmetrical about an axis, the bead core comprising a plurality of windings of at least one metallic wire with diameter d arranged next to one another in a direction P forming an angle α with the axial direction in a radial sectional half-plane R, on N layers superposed on one another in the radial direction, wherein:

α ranges from 0° to 10°;

in the sectional half-plane R, the windings of the bead core form a structure consisting of a base structure and a cap structure, where the radially inner base structure in the shape of a parallelogram is directly in contact in the radial direction with the radially outer cap structure in the shape of a trapezium, wherein:

the base structure of I layers Ci superposed on one another in the radial direction, wherein I is odd and I≥3, comprises:

the radially innermost layer $C_1$ and the radially outermost layer $C_I$ comprise L windings;

wherein i is an integral number ranging from 1 to I−2, $L_i = L_{i+2}$ and $|L_i - L_{i+1}| = 1$, wherein Li is the number of windings of the layer $C_i$ and $Max(L_i) = L$ with:

when i is odd, each axially outermost winding of the layers Ci is arranged in contact with the first outer side which is the straight line parallel to the radial direction and tangent to the axially outermost winding of the layer $C_1$ in the radial sectional half-plane R; and when i is even, the axially outermost winding of the layers Ci is arranged in contact with the axially outermost two windings of the immediately lower layer;

the cap structure of J layers $C_j$ superposed on one another in the radial direction comprises:

the layer $C_{I+1}$ of L−1 windings superposed on layer $C_I$ of the base structure in the radial direction and the axially outermost winding being in contact with the two axially outermost windings of the immediately lower layer; and or when j is an integral number between 1 and J, the layer $C_{I+j}$ is such that:

when j is even, $L_{I+j}=L_{I+(j+1)}$;

when j is odd, $L_{I+j}=L-(j+1)/2$;

such that: when j is odd, the layer $C_{I+j}$ is formed from $L_{I+j}$ windings and the axially outermost winding is arranged in contact with the two axially outermost windings of the immediately lower layer; and when j is even, the layer $C_{I+j}$ comprises $L_{I+j}$ windings arranged next to one another in the direction P from the first outer side;

or when j ranges from 1 to J, the layer $C_{I+j}$ is such that: $L_{I+j}=L-j$ so as to form an isosceles trapezium;

the product of the diameter d times L ranges from 13.0 mm to 25.0 mm; and

N, I and J are integral numbers not equal to zero, such that N=I+J is less than or equal to 16.

In the present application, any range of values denoted by the expression "between a and b" represents the range of values from more than a to less than b (that is to say excluding the end points a and b), whereas any range of values denoted by the expression "from a to b" means the range of values from the end point "a" as far as the end-point "b", namely including the strict end points "a" and "b".

The bead core according to the invention has a generally toroidal form about an axis of revolution. This axis of revolution is congruent with the axial direction when the bead core is in the tyre.

The expression "axial direction" means the direction substantially parallel to the axis of revolution of the bead core or the axis of rotation of the tyre.

As the bead core substantially rotates about an axis of revolution in the radial sectional plane which contains the axis of revolution, the bead core intersects two radial sectional half-planes R arranged symmetrically on either side of this axis of revolution. For reasons of clarity, only a single sectional half-plane R of the bead core is discussed. This sectional half-plane R is the half-plane of which the border is the axis of revolution of the bead core, and which extends in the radial direction.

The expression "radial direction" means the direction along a radius of the bead core or tyre, namely any direction that intersects the main axis of the bead core or the axis of rotation of the tyre and is substantially perpendicular to this axis.

A layer of the bead core is also described as "radially outer" if the main direction in which it extends is further from the axis of rotation of the tyre than those of the other layers of the bead core. On the other hand, a layer of the bead core is described as "radially inner" if the main direction in which it extends is closer to the axis of rotation of the tyre than those of the other layers of the bead core.

A layer means an alignment extending in the main direction P and forming angle $\alpha$ with the axial direction of the tyre in the sectional half-plane R.

The term "directly in contact" means that no other structure is arranged radially between the base structure and the cap structure.

The bead core according to the invention, because its base has the shape of a parallelogram, prevents rotation of the bead core about its axis during curing of the tyre.

According to a first variant of the invention, the bead core is such that the cap structure forms a trapezium with a side forming an angle $\alpha+90°$ between the direction P and the first outer side. Initially, because of the truncated shape of the cap structure, the bead core allows wrapping of the carcass plies about the bead core. Thus the bead core is asymmetric and only truncated on the side of the outgoing strand of the carcass ply or plies, allowing its wrapping around the bead core. On the incoming strand side, the additional windings prevent problems in the preform, and in particular those of the soft bead as illustrated in FIG. 4. In fact a conventional packing rubber, as illustrated in FIG. 5, can only fill the gap left on the side of the outgoing strand of the carcass, and the presence of windings on the side of the incoming strand of the carcass ply or plies helps maintain the geometry of the bead core during wrapping of the carcass ply or plies around the bead core.

According to a second variant of the invention, the bead core is such that the cap structure forms an isosceles trapezium. The bead core is symmetrical and truncated at the level of its cap structure on both sides. To avoid the above-mentioned phenomenon of a soft bead, a packing rubber with an extended range is used which also allows filling of the empty space on the side of the incoming strand of the carcass ply or plies. This packing rubber with extended range, as illustrated in FIG. 6, has a supplementary shape which becomes wound around the bead core and fills the empty space.

The base of the bead core is determined by the product of the diameter d of the metal wires times L number of windings. The person skilled in the art will select the product of d by L optimally within the range from 13.0 to 25.0 mm as a function of the desired tyre dimension.

Thus the bead core has a low rotation on the rim under the effect of the motive force, which improves the efficiency of the vehicle. In fact the geometry of the bead core increases the clamping pressure on the seat of the rim, which improves the anchoring of the bead in the rim and reduces the potential slip between the rim and the tyre. Also, the low rotation on the rim prevents friction of the tyre against the rim and hence degradation of the bead, which would could lead to degradation of the endurance of the tyre.

The effect will be an increase in clamping pressure with an increase of the mean clamping pressure of each bead on the seat of the rim, and an increase in the width of the clamping surface.

The mean clamping pressure of each bead on the seat is determined by sensors which measure pressure from the inside the rim seat towards the outside in the direction P forming an angle $\alpha$ with the axial direction, i.e. on the rim flange.

Advantageously, the product of the diameter d by L is less than or equal to 24.5 mm, and preferably less than or equal to 24.0 mm. The bead core according to the invention is dimensioned so as to meet the specifications of the tyre manufacturer in particular in terms of maximal dimensions.

Advantageously, the product of the diameter d by L is greater than or equal to 14.5 mm, and preferably greater than or equal to 15.0 mm. The greater the length in the direction P, the more limited the risk of rotation of the bead core during curing and hence the risk of disorganisation of the bead core, while enlarging the surface of clamping on the rim seat.

For preference, the angle $\alpha$ is less than or equal to 8° and preferably less than or equal to 6°.

In one embodiment, the angle $\alpha$ is equal to 0°. It is then relatively easy to produce this geometry of a bead core with a flat base.

In another embodiment, the angle $\alpha$ is strictly greater than 0°.

For preference, the angle α is greater than or equal to 3° and preferably greater than or equal to 4°. This improves the distribution of the surface pressure on the rim seat, and hence improves the performance in rotation on the rim under the effect of high torque levels. Also, a good positioning of the maximum pressure in the centre of the rim seat is ensured, which improves the performance in terms of resistance to separation of the tyre from the rim flange.

According to other optional characteristics of the bead core for the tyre, which are independent of one another:
  The bead core for a tyre is obtained by successive superpositions of N layers $C_k$, each layer $C_k$ being obtained by successive windings of at least one metallic wire in a radial sectional half-plane R in a direction P forming an angle α with the axial direction.
  The bead core for a tyre comprises a single metallic wire forming the windings of N layers $C_k$.
  The or each metallic wire is made of a carbon steel comprising between 0.6 and 1.1% carbon by mass.
  The or each wire has a substantially circular cross-section.
  The or each metallic wire is first coated with a polymer compound having a thickness ranging between 0.05 mm to 0.3 mm, and more preferably between 0.1 and 0.2 mm.

A polymer composition or polymeric composition is understood to mean that the composition comprises at least one polymer. Preferably, such a polymer may be a thermoplastic, for example a polyester or a polyamide, a thermosetting polymer, an elastomer, for example natural rubber, a thermoplastic elastomer or a combination of these polymers.

Advantageously, the diameter d ranges from 0.95 mm to 3.00 mm, preferably from 1.20 mm to 2.20 mm, and more preferably from 1.25 to 2.05 mm.

Advantageously, $\max(L_k)=\max(L_i)=L$ is strictly greater than N, with $C_k$ being a layer of the bead core (52) selected from N layers, and $L_k$ is the number of windings of each layer $C_k$, k being an integral number between 1 and N. Thus preferably, the shape of the bead core is such that the greatest length is the radially inner length in the direction P relative to the length in the radial direction, thus maximising the width of the clamping surface of the seat.

Preferably, N ranges from 7 to 16. Thus the number N of layers $C_k$ superposed on one another in a radial sectional plane R is set for wire diameters ranging from 1.25 mm to 2.05 mm suitable for uses of the tyre for an agricultural or forestry vehicle.

Advantageously, I ranges from 5 to 13. Preferably, the number of layers of the upper part J is smaller than that of the lower part I, thus allowing a good geometric stability of the bead core during curing and avoiding any disorganisation thereof.

Advantageously, J ranges from 2 to 4, and preferably from 2 to 3. The bead core according to the invention advantageously has a truncated upper part allowing the wrapping of the carcass ply or plies around the bead core.

A further object of the invention is a method for manufacture of a bead core for a tyre which is substantially rotationally symmetrical about an axis, the bead core comprising a plurality of windings of at least one wire with diameter d arranged next to one another in a direction P forming an angle α with the axial direction in a radial sectional half-plane R, on N layers superposed on one another in the radial direction, wherein:
  the winding is placed in contact with a laying surface of a channel at the radially inner end and the winding is unwound towards the first outer side, which is the straight line parallel to the radial direction and tangent to the outermost winding of the layer, in order to form the layer $C_1$ such that the product of the diameter d times L is strictly less than 25.0 mm,
  I layers Ci are superposed on one another in the radial direction, wherein I is odd and I≥3, so as to form the base structure in the form of the parallelogram in the sectional half-plane R such that:
    the radially innermost layer $C_1$ and the radially outermost layer $C_I$ comprise L windings;
    wherein i is an integral number ranging from 1 to I−2, $L_i=L_{i+2}$ and $|L_i-L_{i+1}|=1$, wherein Li is the number of windings of the layer $C_i$ and $\max(L_i)=L$ with:
    when i is odd, each axially outermost winding of the layers Ci is arranged in contact with the first outer side which is the straight line parallel to the radial direction and tangent to the axially outermost winding of the layer $C_1$ in the radial sectional half-plane R; and
    when i is even, the axially outermost winding of the layers Ci is arranged in contact with the two axially outermost windings of the immediately lower layer;
  J layers Ci are superposed on one another in the radial direction so as to form a cap structure in the sectional half-plane R such that:
    layer $C_{I+1}$ of L−1 windings is superposed on layer $C_I$ of the base structure in the radial direction; and
    or when j is an integral number between 1 and J, the layer $C_{I+j}$ is such that:
  when j is even, $L_{I+j}=L_{I+(j-1)}$;
  when j is odd, $L_{I+j}=L-(j+1)/2$;
  such that: when j is odd, the layer $C_{I+j}$ is formed from $L_{I+j}$ windings and the axially outermost winding is arranged in contact with the two axially outermost windings of the immediately lower layer; and
  when j is even, the layer $C_{I+j}$ comprises $L_{I+j}$ windings arranged next to one another in the direction P from the first outer side;
    or when j ranges from 1 to J, the layer $C_{I+j}$ is such that: $L_{I+j}=L-j$ so as to form an isosceles trapezium;
  with N, I and J integral numbers not equal to zero, such that N=I+J is less than or equal to 16.

In a variant of the manufacturing method of the bead core, the wrapping begins from the first outer side, i.e. the winding is placed in contact with a laying surface of a channel at the radially inner end and the winding is unwound towards the first inner side, which is the straight line parallel to the radial direction and tangent to the innermost winding of the layer, in order to form the layer $C_1$ such that the product of the diameter d times L is strictly less than 25.0 mm.

In a preferred embodiment, the or each metallic wire is first coated with a polymer compound having a thickness ranging from 0.1 to 0.2 mm. This polymer compound allows the geometry of the bead core to be maintained when it is removed from the laying mould.

In another embodiment, ligatures may be placed around all or part of the bead core, for example metallic staples comprising metallic wires of rectangular section which maintain the geometry of the bead core when it is removed from the laying mould.

In a preferred embodiment, the bead core is covered with at least one fabric comprising filamentary elements comprising at least one multifilament strand comprising several monofilaments, each made up of a material selected from a polyester, a polyamide, a polyketone, a polyurethane, a natural fibre, a mineral fibre, preferably selected from a polyester, an aromatic or aliphatic polyamide, a polyketone, a polyurethane, a natural fibre and an assembly of these materials, more preferably selected from an aliphatic polyamide and an assembly of these materials.

A filament made of aliphatic polyamide is understood to be a filament of linear macromolecules of polymers or copolymers containing amide functions that do not have aromatic rings and can be synthesized by polycondensation between a carboxylic acid and an amine. Among the aliphatic polyamides, mention may be made of nylons PA4.6, PA6, PA6.6 or PA6.10, and in particular Zytel from the company DuPont, Technyl from the company Solvay or Rilsamid from the company Arkema.

This coating of the bead core according to the invention helps guarantee better retention of the geometry of the bead core between its manufacture and its use in the tyre. Also, this coating avoids any contact between the wires of the bead core and the carcass ply, thus forming a barrier.

A further object of the invention is a tyre for an agricultural or forestry vehicle comprising:
- at least one bead comprising a bead core according to the invention,
- a carcass reinforcement comprising at least one carcass ply anchored in each bead by a return around the bead core.

A further object of the invention is a method for manufacturing a tyre as defined above in which:
- the bead core is laid on the carcass ply,
- part of the carcass ply is returned around the bead core, and
- the carcass ply and bead core are turned relative to one another.

In one embodiment, the bead core is fixed and the carcass ply is turned around the bead core, causing wrapping of the carcass ply around the bead core.

In another embodiment, the carcass ply is fixed and the assembly of the intermediate preform of the annular reinforcing structure, comprising the bead core, is turned around the manufacturing drum, the bead core remaining fixed.

Advantageously, the carcass reinforcement comprises a single carcass ply anchored in each bead by a return around the bead core according to the invention.

BRIEF DESCRIPTION OF THE FIGURES

The invention will be understood better on reading the following description of the figures, which is given purely by way of non-limiting example and with reference to the drawings, in which.

DETAILED DESCRIPTION

The tyre according to the invention has a generally toroidal form about an axis of rotation. This axis of rotation defines the axial direction.

When using the term "radial", a distinction should be made between several different uses of the word by the person skilled in the art when speaking of a tyre.

Firstly, the expression refers to a radius of the tyre. It is in that sense that an element A is said to be "radially inside" an element B (or "radially on the inside of" the element B) if it is closer to the axis of rotation of the tyre than is the element B. Conversely, an element C is said to be "radially outside" an element D (or "radially on the outside of" the element D) if it is further from the axis of rotation of the tyre than is the element D. Progress "radially inwards (or outwards)" will mean progress towards smaller (or larger) radii.

Secondly, a reinforcing element or a reinforcement is said to be "radial" when the reinforcing element or the reinforcing elements of the reinforcement make an angle greater than or equal to 65° and less than or equal to 90° with the circumferential direction.

Thirdly, a "radial cross-section" or "radial section" here means a cross-section or a section in a plane which contains the axis of rotation of the tyre.

An "axial" direction is a direction parallel to the axis of rotation of the tyre. An element E is said to be "axially inside" an element F (or "axially on the inside of" the element F) if it is closer to the median plane of the tyre than is the element F. Conversely, an element G is said to be "axially outside" an element H (or "axially on the outside of" the element H) if it is further from the median plane of the tyre than is the element H.

The "median plane" of the tyre is the plane which is perpendicular to the axis of rotation of the tyre and which lies at equal distances from the annular reinforcing structures of each bead.

A "circumferential" direction is a direction that is perpendicular both to a radius of the tyre and to the axial direction.

Example of a Tyre and Bead Core According to the Invention

Tyre 10 According to the Invention

Figure 1:
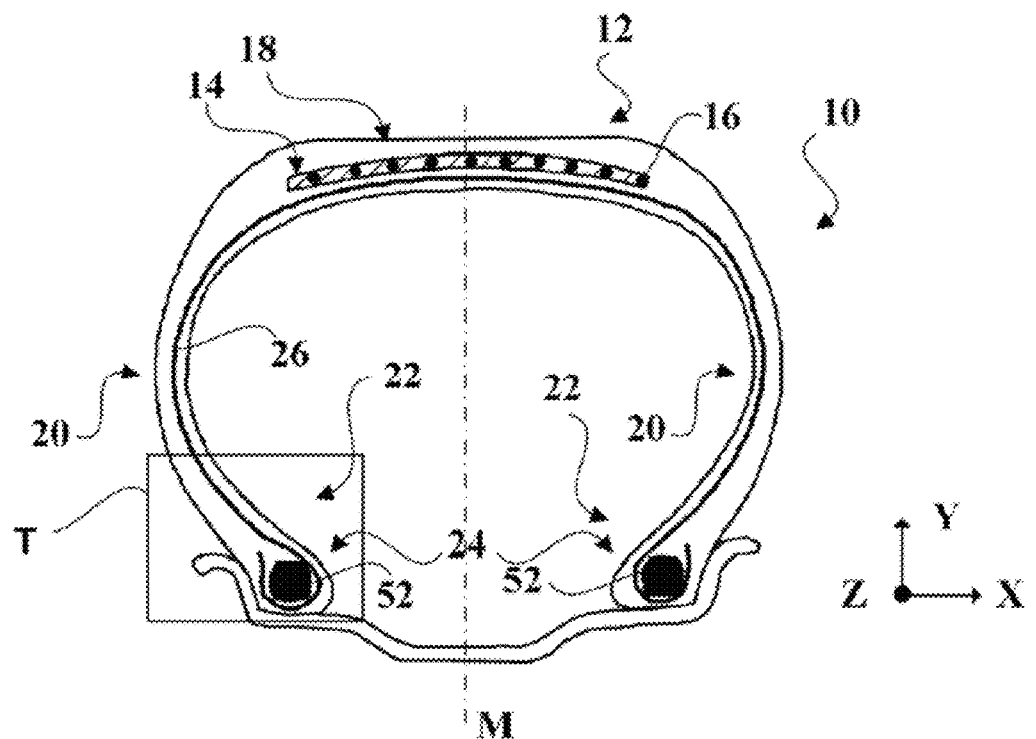
FIG. 1 is a radial sectional view of a tyre according to the invention.
Figure 2:
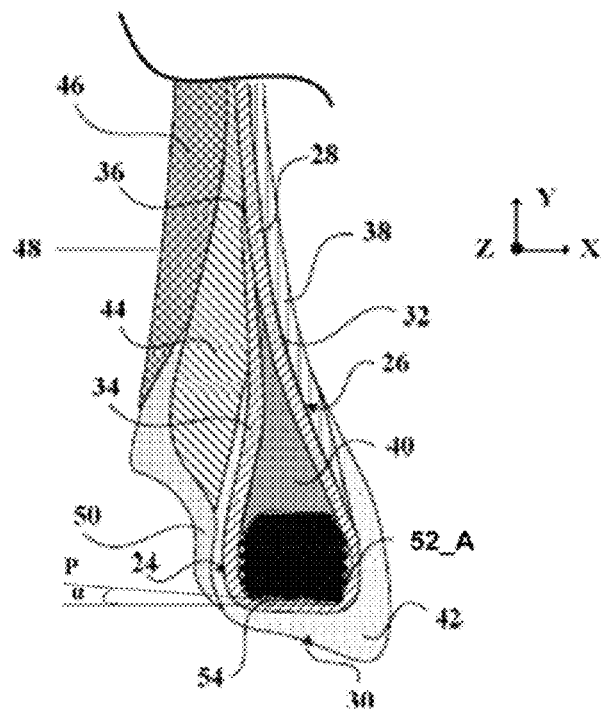
FIG. 2 is a detailed sectional view of the zone T of the tyre of FIG. 1.
Figure 3:
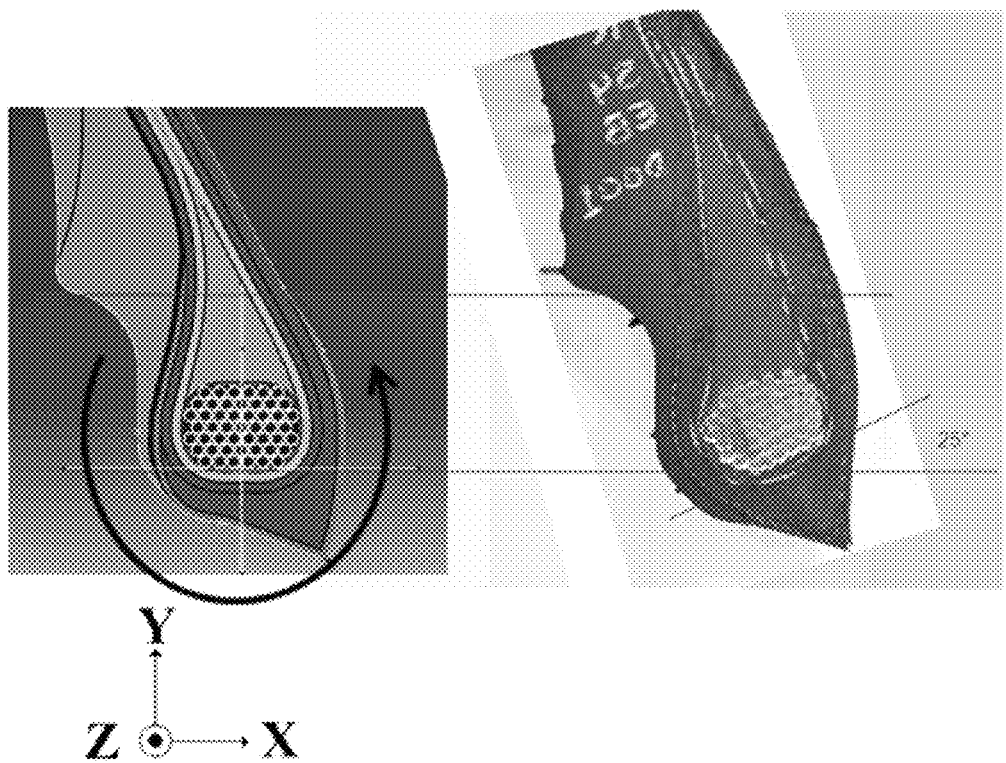
FIG. 3 is an illustration of the rotation of the bead core of the prior art around the carcass ply after the step of curing of the tyre.
Figure 4:
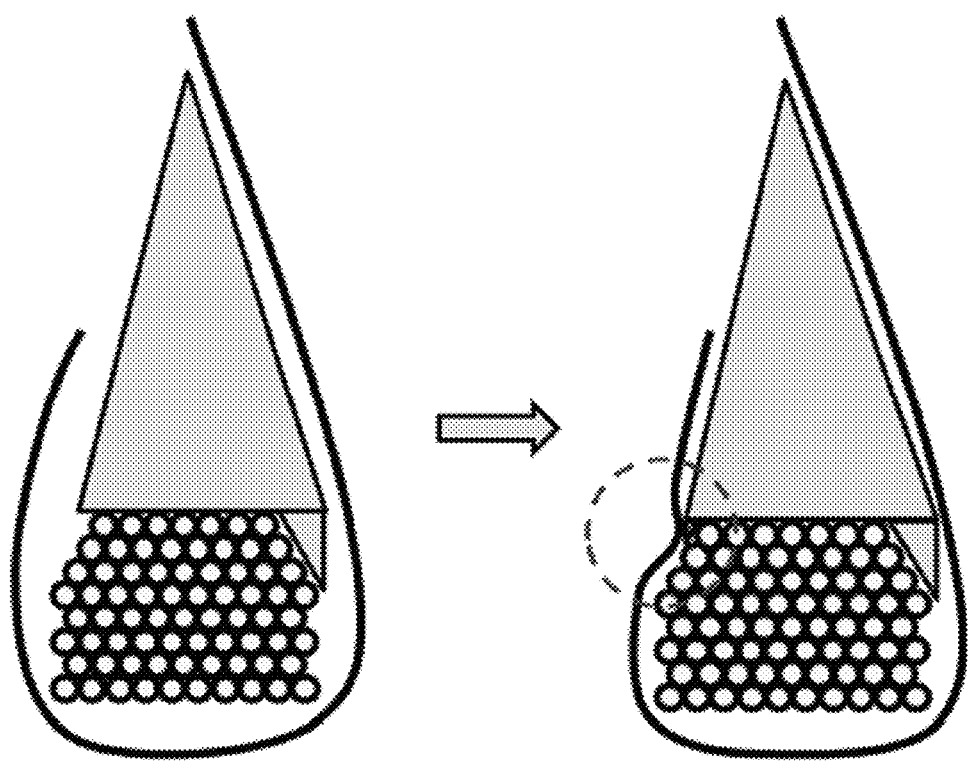
FIG. 4 is an illustration of the phenomenon of soft bead.
Figure 5:
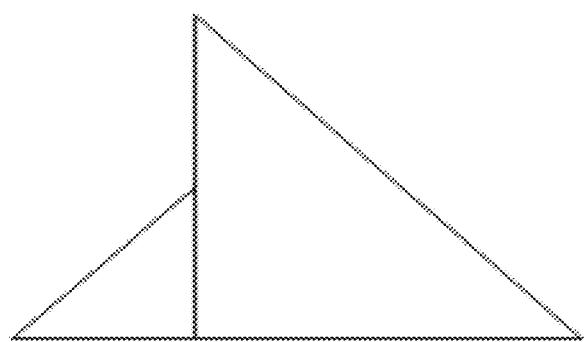
FIGS. 5 and 6 are two schematic illustrations of the conventional packing rubber and the packing rubber with extended range.

FIGS. 1 and 2 show directions X, Y, Z corresponding to the usual axial (X), radial (Y) and circumferential (Z) directions of a tyre.

FIGS. 1 and 2 show an exemplary tyre according to the invention and denoted by the general reference 10. The tyre 10 is preferably intended for an industrial vehicle selected from agricultural or forestry vehicles. In this case, the tyre 10 is intended for an agricultural vehicle, for example a tractor.

The tyre 10 has a nominal rim diameter as defined by ETRTO (European Tyre and Rim Technical Organisation) ranging from 24 to 54 inches (60.96 cm to 137.16 cm). The tyre 10 has a nominal aspect ratio is defined by ETRTO ranging from 0.7 to 0.9.

The tyre 10 has a crown 12 comprising a crown reinforcement 14 comprising one or more crown plies 16 of reinforcing elements. The crown reinforcement 14 is surmounted by a tread 18. The crown reinforcement 14 is arranged radially inside the tread 18. Two sidewalls 20 extend the crown 12 radially inwards. The tyre 10 has two beads 22 radially inside the sidewalls 20, each comprising an annular reinforcing structure 24.

The tyre 10 also has a radial carcass reinforcement 26. The carcass reinforcement 26 extends from the beads 22 through the sidewalls 20 towards the crown 12. The carcass reinforcement 26 comprises one or more carcass plies 28, wherein at least one of these carcass plies 28 is anchored in each of the beads 22 by a return 30 around the annular reinforcing structure 24, so as to form, in each bead 22, an outgoing strand 32 extending radially between each bead 22 through the sidewalls 20 and the crown 12, and an incoming strand 34 extending radially from each bead 22 through each sidewall 20, the radially outer end 36 of the return strand 34 being situated radially outside the annular reinforcement structure 24 and axially outside the outgoing strand 32.

The tyre 10 also comprises an inner sealing liner 38 arranged radially and axially inside the carcass reinforcement 26. The inner liner 38 extends between each bead 22, passing through the sidewalls 20 and the crown 12.

Each bead 22 comprises, in addition to the annular reinforcing structure 24, a mass 40 of packing rubber arranged in a space delimited by the outgoing strand 32 and incoming strand 34. Each bead 22 also comprises a first mass 42 of rubber protecting the bead 22 following the return 30 of the carcass reinforcement 26.

Furthermore, each bead 22 also comprises a mass 44 of packing rubber arranged axially outside the carcass reinforcement 26, in particular axially outside the incoming strand 34. Each sidewall 20 comprises an axially outer mass 46 of rubber delimiting an axially outer surface 48 of the sidewall 20 and arranged axially outside the mass 44 of packing rubber. Finally, each bead 22 comprises a second mass 50 for protection of the bead 22, arranged axially between the packing rubber 44 and the axially outer mass 46 of rubber of the sidewall 20.

Each annular reinforcing structure 24 comprises an annular bead core 52_A coated with a coating mass 54, for example comprising rubber. The bead core 52_A is arranged radially inside the packing rubber 40. The bead core 52_A complies with the first variant of the first embodiment of the invention.

Figure 7:
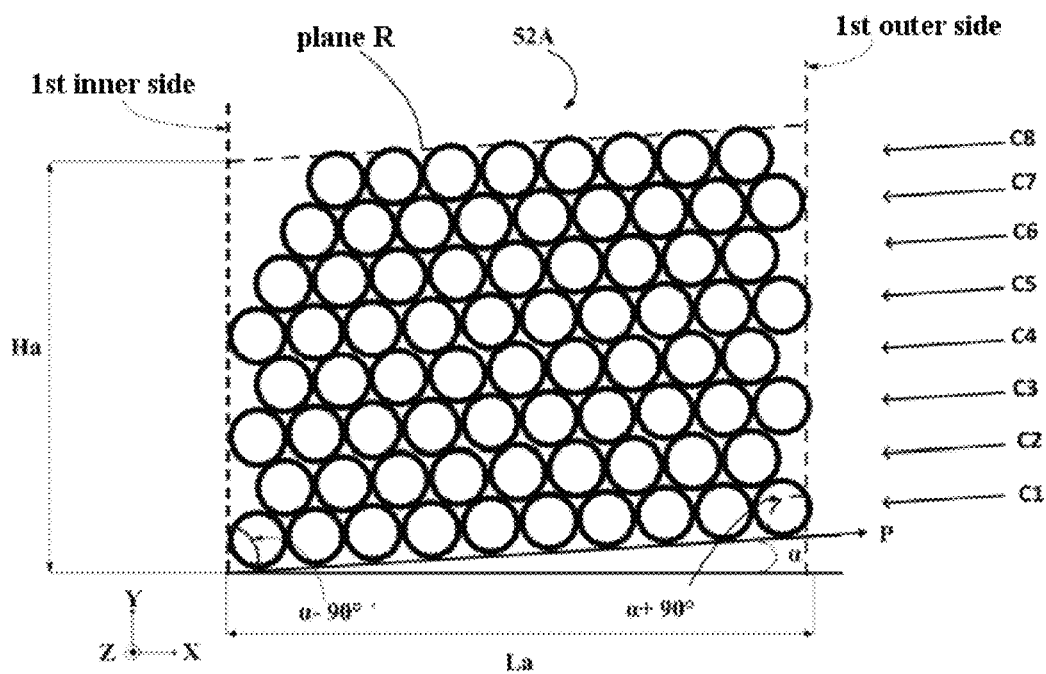
FIG. 7 is a sectional view of a bead core 52_A according to a first variant of the first embodiment of the invention.

Bead Core 52_A According to a First Variant of the First Embodiment of the Invention FIG. 7 shows the bead core 52_A according to a first variant of the first embodiment of the invention.

The bead core 52_A has a generally symmetrical form in rotation about the axis of revolution of the tyre 10 which is substantially parallel to the axial direction X.

The bead core 52_A comprises n windings of at least one wire of diameter d arranged in a radial sectional half-plane R in a direction P forming an angle $\alpha$ with the axial direction, next to one another over N layers $C_k$ superposed on the layer $C_{i+1}$ in the radial sectional half-plane R. The bead core 52_A is obtained by successive superpositions of N layers $C_k$, with k varying from 1 to N inclusive, each layer $C_k$ being obtained by successive axial windings of at least one wire. The total number of windings n of the bead core 52_A is greater than or equal to 30, preferably to 50 and more preferably to 70, here n=74.

Figure 6:
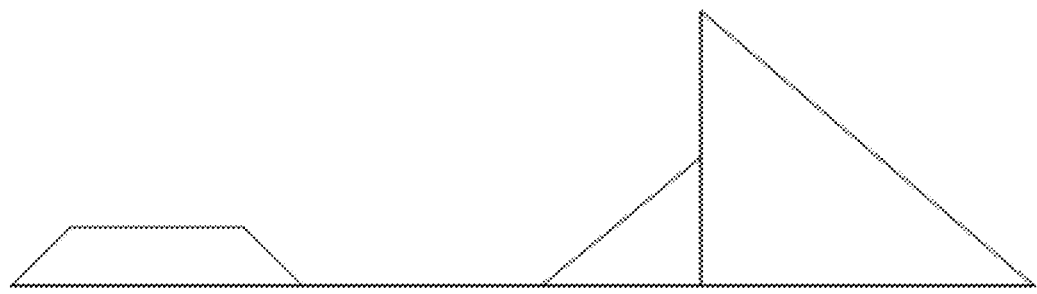

In a first variant of the first embodiment shown in FIG. 6, the bead core 52_A comprises n windings of a single wire.

Preferably, the wire is metallic, has a substantially circular cross-section, and advantageously a diameter between 0.95 mm and 3.00 mm, preferably between 1.20 mm and 2.20 mm, and more preferably between 1.25 mm and 2.05 mm, here a diameter equal to 1.55 mm. The wire is made of a carbon steel comprising 0.7% carbon by mass. The metallic wire is first coated with a polymer compound with thickness ranging from 0.05 mm to 0.3 mm, advantageously between 0.1 and 0.2 mm. Here, the thickness is 0.15 mm.

Table 1 below shows the number of windings $L_k$ of each layer $C_k$. The maximum number of windings $max(L_k)$ of the N layers $C_k$ is such that $max(L_k)=max(L_i)=L$ is strictly greater than N. Here $max(L_k)=N+2$.

TABLE 1

| Layer number | Number of windings $L_k$ |
| --- | --- |
| C1 | 10 |
| C2 | 9 |
| C3 | 10 |
| C4 | 9 |
| C5 | 10 |
| C6 | 9 |
| C7 | 9 |
| C8 | 8 |

The bead core 52_A comprises at least one layer $C_k$ with k∈]1, N [such that $L_{k+1}>L_k$ and $L_k<L_{k-1}$, here $L_3>L_2$ and $L_2<L_1$ The bead core in the sectional half-plane R is composed of a radially inner base structure in the form of a parallelogram, here represented by layers C1 to C5, which is in direct contact in the radial direction with a radially outer cap structure in the form of a trapezium, here represented by layers C6, C7 and C8.

For the cap structure, the number of windings of layer $C_6$ is $L_6=L-1=10-1=9$ which are arranged one next to the other in the direction P from the first outer side, and the layer $C_7$ has the same number of windings as the layer $C_6$, or $L_7=9$ windings, which are arranged one next to the other in the direction P from the first inner side. Finally, the last layer $C_8$ is such that $L_8=L-(3+1)/2=10-2=8$ so as to form a trapezium.

N is an integral number not equal to zero, less than or equal to 16, and ranges from 7 to 16. Here N=I+J=8.

I ranges from 5 to 13. Here I=5.

J ranges from 2 to 3. Here J=3.

L=10.

The product of the diameter d times L is firstly strictly greater than 14.0 mm, preferably greater than or equal to 14.5 mm, and more preferably greater than or equal to 15.0 mm, and secondly less than or equal to 25.0 mm, preferably less than or equal to 24.5 mm, and more preferably less than or equal to 24.4 mm. Here d×L=1.55×10=15.50 mm.

The angle $\alpha$ ranges from 0° to 10°, is preferably less than or equal to 6°, and greater than or equal to 4°. Here, $\alpha$ is equal to 5°.

The angle $\alpha+90°=95°$.

The bead core comprises a layer $C_1$ and $C_j=C_5$ of L=10 windings.

Example of a Method for Manufacturing a Tyre and Bead Core According to the Invention Method for Manufacturing the Tyre 10

We will now describe a method for manufacturing a tyre 10 according to the invention with reference to FIGS. 15 to 18.

Firstly, in a first assembly phase, the various plies, rubber masses and other elements described above are assembled in order to form an initial preform on an assembly drum, as known to the person skilled in the art.

Then, successively and in this order, the first mass 42 of protection rubber is laid, followed by the inner sealing layer 38, one or more carcass plies 28 intended to be anchored in the beads 22, the packing rubber 40, and the annular reinforcing structure 24 comprising the bead core 52_A and the coating mass 54. The bead core 52_A has thus been laid on the carcass ply or plies 28. This gives the intermediate preform shown in FIG. 15.

Then the first mass 42 of protection rubber, and a part of the carcass ply or plies 28, here the incoming strand 34, are folded around the annular reinforcing structure 24. This gives the intermediate preform shown in FIG. 16.

Then, successively and in this order, the packing rubber 44 is applied, followed by the second protection mass 50 and finally the axially outer mass 46 of rubber delimiting the axially outer surface 48 of the sidewall 20. This gives the intermediate preform shown in FIG. 17.

Then the carcass ply or plies 28 and the bead core 52_A are turned relative to one another. In this case, the assembly of the intermediate preform, with the exception of the annular reinforcing structure 24, is turned around the latter which remains substantially fixed during the rotation. This gives the intermediate preform shown in FIG. 18. It will be noted that after the rotation, the bead core 52_A has the same orientation as before the rotation, and that the various plies and rubber masses have not been deformed under the effect of the rotation.

In a second, subsequent finishing phase, the crown 12 and the tread 18 are added to the intermediate preform previously obtained.

In a third curing phase, the finished preform is cured so as to produce the cured tyre.

Process for the Manufacture of the Bead Core 52_A

Figure 19:
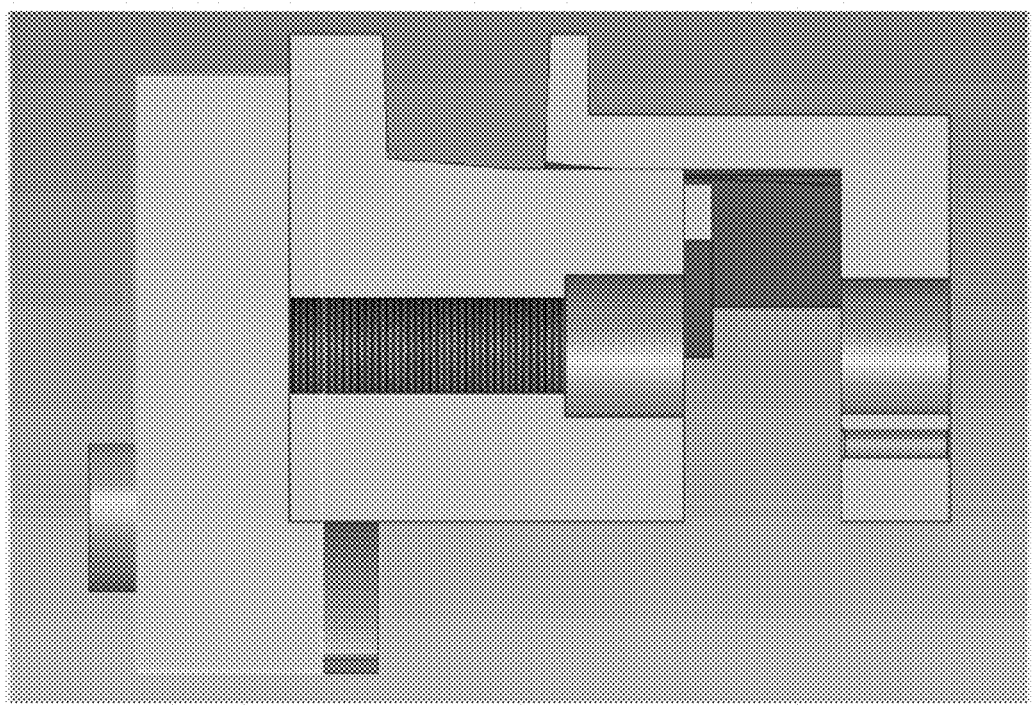
FIG. 19 is an illustration of the channel used during the method of manufacturing the bead core according to the invention.

We will now describe a method for manufacturing a bead core 52_A according to the invention with reference to FIG. 19.

The wire of diameter d=1.55 mm, previously coated with an elastomer compound, is brought into contact with a laying surface of a channel in the radial section plane in the direction P forming an angle α with the axial direction, α=5°, and the wire is wound from a channel at the radially inner end, and the wire is wound by L=10 windings towards the first outer side in order to form a radially inner layer $C_1$, such that the product of the diameter d times L is strictly less than 25.0 mm, here d×L=15.5 mm, and strictly greater than 14.0 mm, and N, I and J are integral numbers not equal to zero, such that N=I+J is less and or equal to 16, N=8=5+3.

I layers Ci are superposed on one another in the radial direction, wherein I is odd and I≥3, here I=5, so as to form the base structure in the form of the parallelogram in the sectional half-plane R such that:

the radially innermost layer $C_1$ and the radially outermost layer $C_5$ comprise L windings;

wherein i is an integral number ranging from 1 to I−2=3, $L_i=L_{i+2}$ and $|L_i-L_{i+1}|=1$, wherein Li is the number of windings of the layer $C_i$ and $Max(L_i)=L$ with:

when i is odd, each axially innermost winding of the layers Ci is arranged in contact with the first inner side which is the straight line parallel to the radial direction and tangent to the axially innermost winding of the layer $C_1$ in the radial sectional half-plane R. Here, I=5 and the layers $C_i$ are layers $C_1$ to $C_5$, $L_1=L_3=L_5=10$ windings and $L_2=L_4=9$ windings.

J=3 layers Ci are superposed on one another in the radial direction so as to form a cap structure in the sectional half-plane R.

Layer $C_{I+j}$ is such that: when j is even, $L_{I+j}=L_{I+(j-1)}$ and when j is odd, $L_{I+j}=L-(j+1)/2$ such that when j is odd, the layer $C_{I+j}$ is formed from $L_{I+j}$ windings and the axially outermost winding is arranged in contact with the two axially outermost windings of the immediately lower layer; and when j is even, the layer $C_{I+j}$ is formed from $L_{I+j}$ windings arranged next to one another in the direction P from the first outer side. Here, the layer in contact with the layer $C_6$ is the layer $C_7$ which has $L_6=L_7=9$ windings, and the layer $C_8$ has $L_8=10-(3+1)/2=8$ windings.

The bead core 52_A is covered with at least one fabric comprising filamentary elements comprising at least one multifilament strand comprising several monofilaments, each made up of a material selected from a polyester, a polyamide, a polyketone, a polyurethane, a natural fibre, a mineral fibre, preferably selected from a polyester, an aromatic or aliphatic polyamide, a polyketone, a polyurethane, a natural fibre and an assembly of these materials, more preferably selected from an aliphatic polyamide and an assembly of these materials, here the bead core 52_A is coated with a crossed fabric comprising an assembly of 2 multifilamentary strands comprising several monofilaments, each composed of an aliphatic polyamide material, nylon N94/1.

The fabric is first bonded with a polymer compound, thus allowing it to be well supported while being laid around the bead core.

Figure 8:
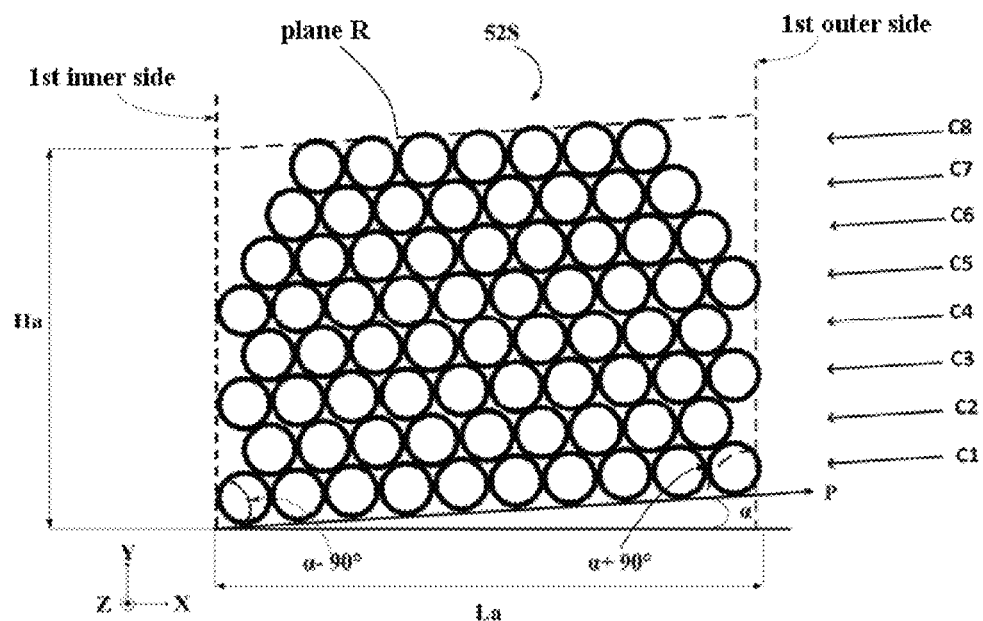
FIG. 8 is a sectional view of a bead core 52_S according to a second variant of the first embodiment of the invention.

Bead Core 52_S According to a Second Variant of the First Embodiment of the Invention FIG. 8 shows a bead core 52_S according to a second variant of the first embodiment of the invention.

In contrast to the bead core according to the first variant of the first embodiment, the bead core 52_S of the second variant of the first embodiment comprises n=72 windings.

Table 2 below shows the number of windings $L_i$ of each layer $C_k$. Here $max(L_k)=L=10$.

TABLE 2

| Layer number | Number of windings $L_k$ |
|---|---|
| C1 | 10 |
| C2 | 9 |
| C3 | 10 |
| C4 | 9 |
| C5 | 10 |
| C6 | 9 |
| C7 | 8 |
| C8 | 7 |

Here, the bead core according to the sectional half-plane R is composed of a radially inner base structure in the shape of a parallelogram, here represented by layers C1 to C5, which is in direct contact in the radial direction with a radially outer cap structure in the shape of a trapezium, here represented by layers C6, C7 and C8.

For the cap structure, the number of windings $L_{I+j}$ of the layer $C_{I+j}$ is such that $L_{I+j}=L-j$ so as to form an isosceles trapezium. Here $L_6=L-1$ and $L_7=L-2$ and $L_8=L-3$.

Other Example of a Bead Core According to a First Variant of the Invention

Figure 9:
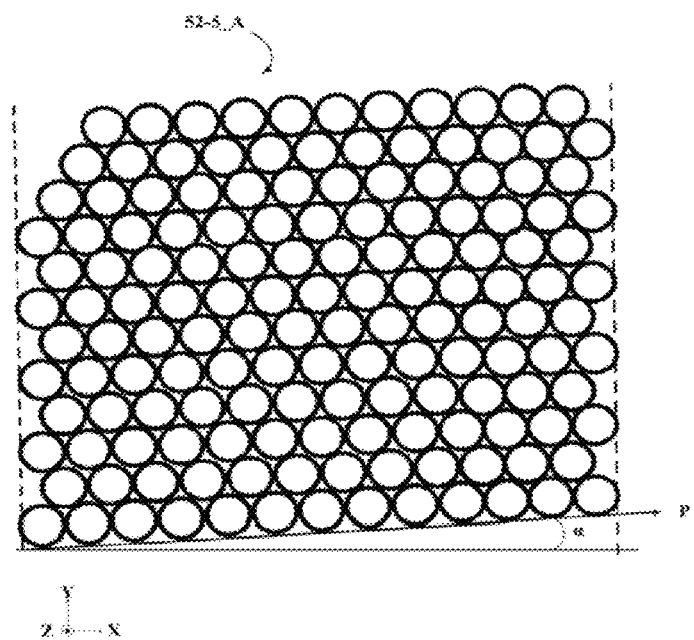
FIG. 9 is a view similar to that of FIG. 7 of a bead core 52-5_A according to a first variant of the sixth embodiment of the invention.

FIG. 9 shows a bead core 52-5_A according to a first variant of the sixth embodiment of the invention.

In contrast to the bead core according to the first variant of the first embodiment, the bead core 52-5_A of the first variant of the sixth embodiment comprises N=12 layers and n=148 windings.

Table 3 below shows the number of windings $L_k$ of each layer $C_k$. Here $max(L_k)=L=13$.

TABLE 3

| Layer number | Number of windings $L_k$ |
|---|---|
| C1 | 13 |
| C2 | 12 |
| C3 | 13 |
| C4 | 12 |
| C5 | 13 |
| C6 | 12 |
| C7 | 13 |
| C8 | 12 |
| C9 | 13 |
| C10 | 12 |
| C11 | 12 |
| C12 | 11 |

Other Examples of Bead Cores According to the Second Variant of the Invention

FIGS. 10, 11, 12, 13 and 14 show bead cores according to other embodiments of the invention. In these figures, elements similar to those of FIG. 7 are denoted by identical references.

Figure 10:
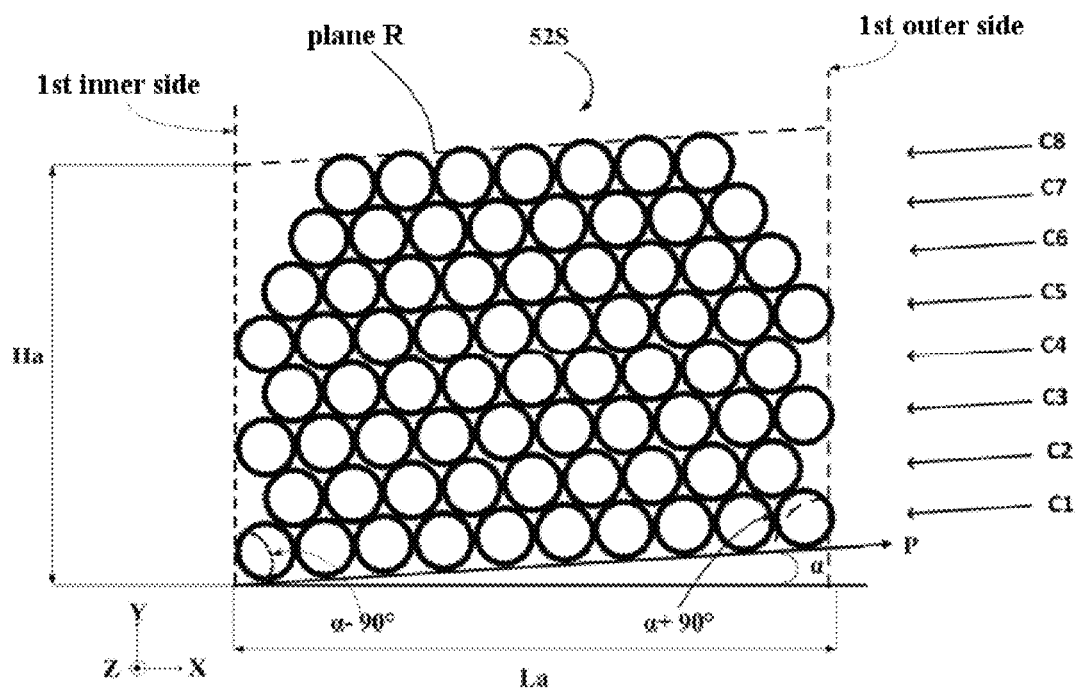
FIGS. 10 to 14 are views similar to that of FIG. 8 of bead cores 52-1_S, 52-2_S, 52-3_S, 52-4_S and 52-5_S respectively according to a second variant of the second, third, fourth, fifth and sixth embodiments.

FIG. 10 depicts a bead core according to a second embodiment of the invention.

In contrast to the bead core according to the second variant of the first embodiment, the bead core 52-1_S of the second embodiment comprises N=7 layers and n=51 windings.

Table 4 below shows the number of windings $L_k$ of each layer $C_k$. Here $max(L_k)=L=8$.

TABLE 4

| Layer number | Number of windings $L_k$ |
|---|---|
| C1 | 8 |
| C2 | 7 |
| C3 | 8 |
| C4 | 7 |
| C5 | 8 |
| C6 | 7 |
| C7 | 6 |

Figure 11:
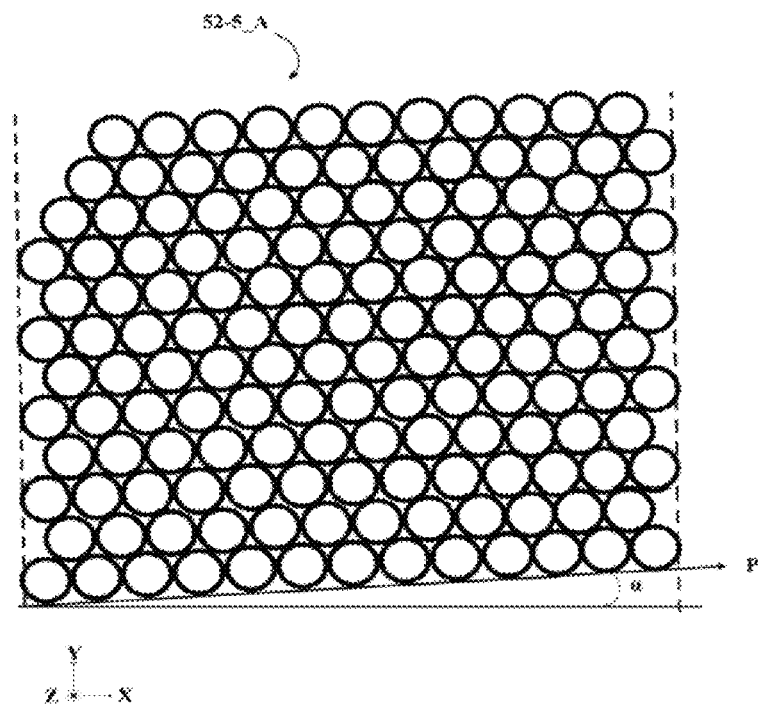

FIG. 11 depicts a bead core according to a third embodiment of the invention.

The bead core 52-2_S according to the third embodiment comprises N=7 layers and n=58 windings.

Table 5 below shows the number of windings $L_k$ of each layer $C_k$. Here $max(L_k)=L=9$.

TABLE 5

| Layer number | Number of windings $L_k$ |
|---|---|
| C1 | 9 |
| C2 | 8 |
| C3 | 9 |
| C4 | 8 |
| C5 | 9 |
| C6 | 8 |
| C7 | 7 |

Figure 12:
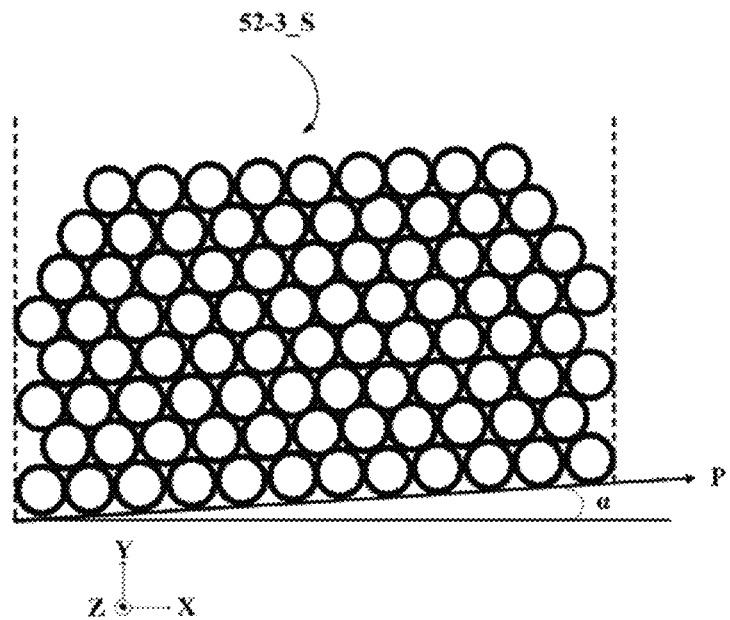

FIG. 12 depicts a bead core according to a fourth embodiment of the invention.

The bead core 52-3_S according to the fourth embodiment comprises N=8 layers and n=88 windings.

Table 6 below shows the number of windings $L_k$ of each layer $C_k$. Here $max(L_k)=L=12$.

TABLE 6

| Layer number | Number of windings $L_k$ |
|---|---|
| C1 | 12 |
| C2 | 11 |
| C3 | 12 |
| C4 | 11 |
| C5 | 12 |
| C6 | 11 |
| C7 | 10 |
| C8 | 9 |

Figure 13:
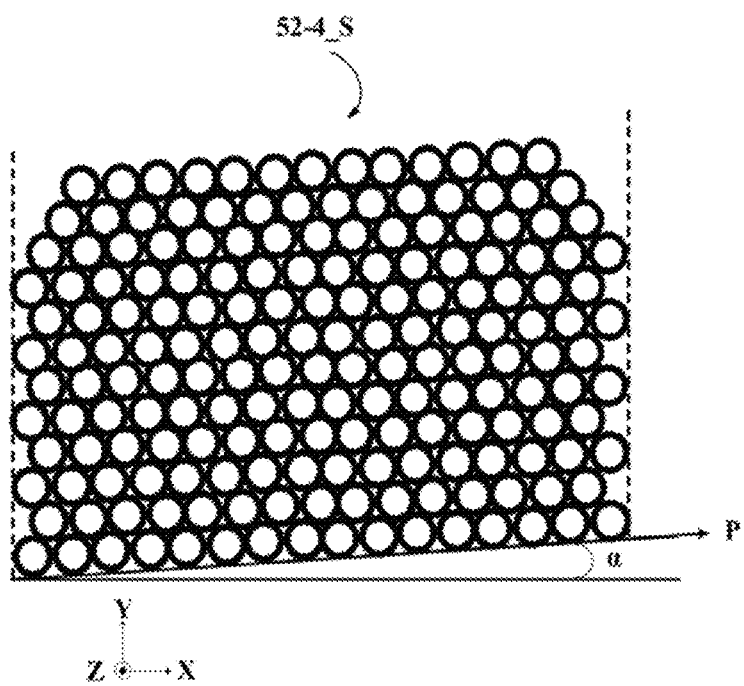

FIG. 13 depicts a bead core according to a fifth embodiment of the invention.

The bead core 52-4_S according to the fifth embodiment comprises N=12 layers and n=182 windings.

Table 7 below shows the number of windings $L_k$ of each layer $C_k$. Here $max(L_k)=L=16$.

TABLE 7

| Layer number | Number of windings $L_k$ |
|---|---|
| C1 | 16 |
| C2 | 15 |
| C3 | 16 |
| C4 | 15 |
| C5 | 16 |
| C6 | 15 |
| C7 | 16 |
| C8 | 15 |
| C9 | 16 |
| C10 | 15 |
| C11 | 14 |
| C12 | 13 |

Figure 14:
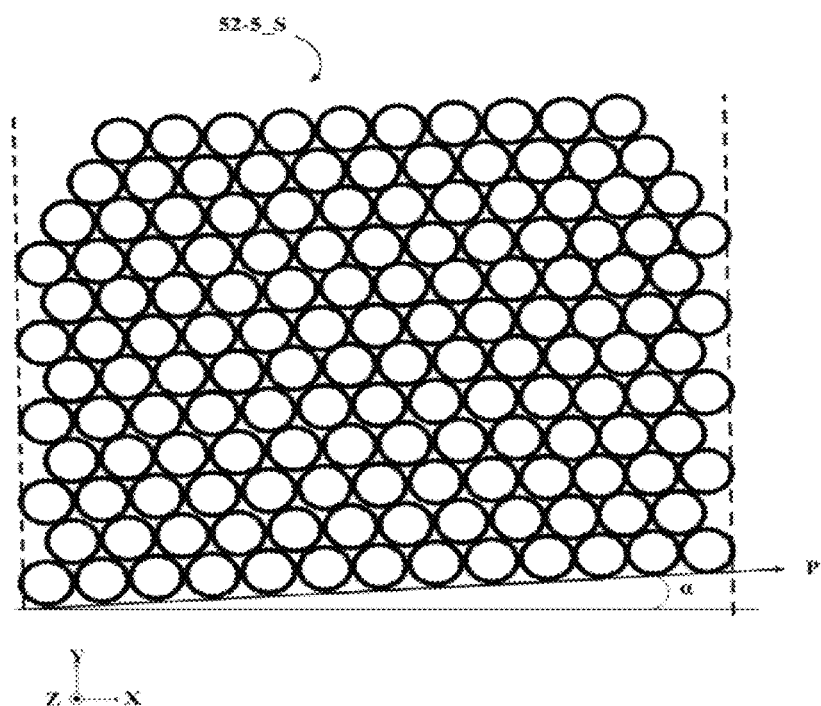
Figure 15:
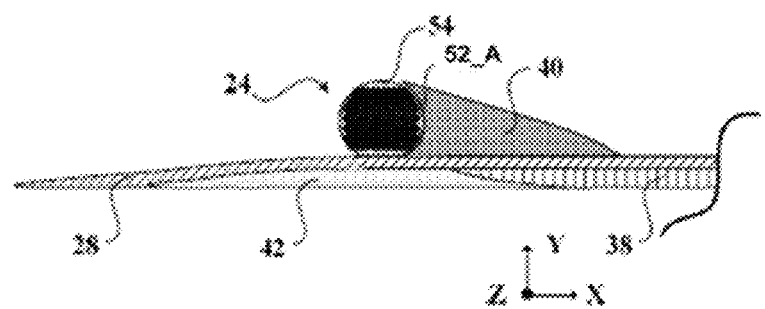
FIGS. 15 to 18 are sectional views illustrating various steps in the method of manufacturing the tyre according to the invention.
Figure 16:
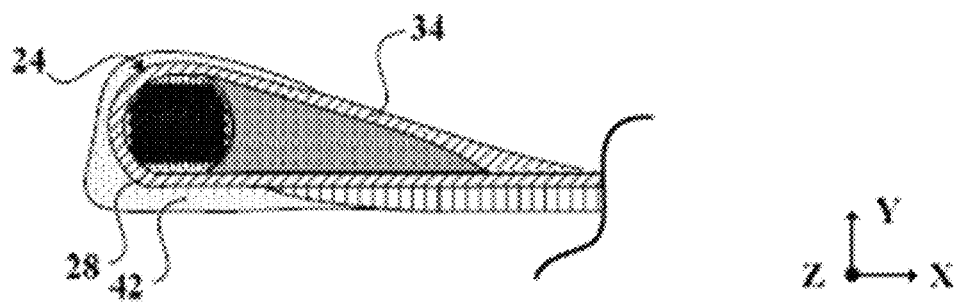
Figure 17:
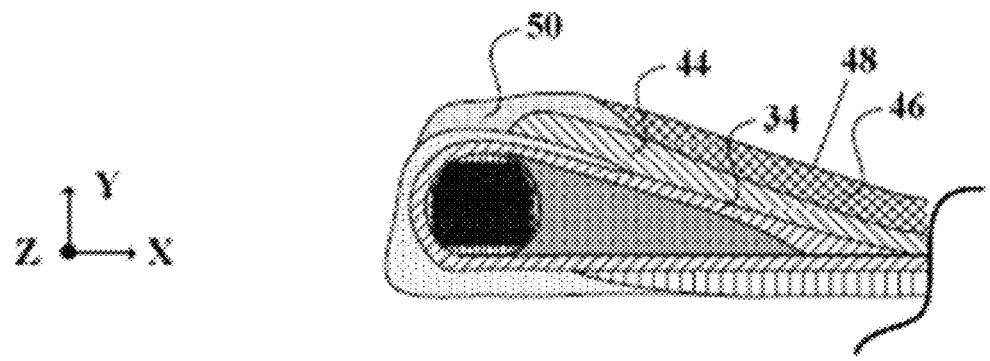
Figure 18:
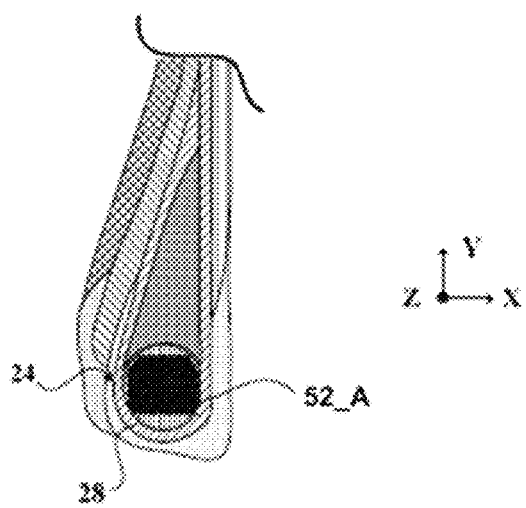

FIG. 14 shows a bead core according to a second variant of the sixth embodiment of the invention.

The bead core 52-5_S according to the second variant of the sixth embodiment comprises N=12 layers and n=146 windings.

Table 8 below shows the number of windings $L_k$ of each layer $C_k$. Here $max(L_k)=L=13$.

TABLE 8

| Layer number | Number of windings $L_k$ |
|---|---|
| C1 | 13 |
| C2 | 12 |
| C3 | 13 |
| C4 | 12 |
| C5 | 13 |
| C6 | 12 |
| C7 | 13 |
| C8 | 12 |
| C9 | 13 |
| C10 | 12 |
| C11 | 11 |
| C12 | 10 |

The comparative bead core TPFR-C is a bead core with a square base which is narrower than the bead cores of the first to fifth embodiments. Table 9 below shows the number of windings of each layer of the TPFR-C.

TABLE 9

| Layer number | Number of windings $L_k$ |
|---|---|
| C1 | 9 |
| C2 | 8 |
| C3 | 9 |

TABLE 9-continued

| Layer number | Number of windings $L_k$ |
|---|---|
| C4 | 8 |
| C5 | 9 |
| C6 | 8 |
| C7 | 7 |

Tables 10 and 11 below show the characteristics of the various bead cores of the prior art, TPC and TPFR-H, a comparative bead core TPFR-C, and the bead cores of the first variants of the first and sixth embodiment, and the bead cores the second variants of the first to sixth embodiments. The width La is the projection of the direction perpendicular to the plane P over the axial direction of the bead core, and the height Ha is the distance between the projection of the straight line passing through the radially outermost layer of the bead core parallel to direction P over the first inner side, and the projection of the direction P over the first inner side.

TABLE 10

| Bead core | TPC | TPFR_H | TPFR_C | 52_A | 52-5_A |
|---|---|---|---|---|---|
| n (number of wires) | 72 | 44 | 58 | 74 | 148 |
| Diameter of wires (mm) | 1.30 | 1.55 | 1.55 | 1.55 | 1.55 |
| L | 9 | 5 | 9 | 10 | 13 |
| d × L (mm) | 11.70 | 7.75 | 13.95 | 15.50 | 20.15 |
| La (mm) | 14.4 | 9.3 | 16.7 | 18.5 | 24.1 |
| Ha (mm) | 12.8 | 11.5 | 11.5 | 13.1 | 19.5 |
| max $L_k$ | 9 | 8 | 9 | 10 | 13 |
| Number of layers N | 8 | 7 | 7 | 8 | 12 |

TABLE 11

| Bead core | 52_S | 52-1_S | 52-2_S | 52-3_S | 52-4_S | 52-5_S |
|---|---|---|---|---|---|---|
| n (number of wires) | 72 | 51 | 58 | 88 | 182 | 146 |
| Diameter of wires (mm) | 1.55 | 2.00 | 1.75 | 1.30 | 0.96 | 1.55 |
| L | 10 | 8 | 9 | 12 | 16 | 13 |
| d × L (mm) | 15.50 | 16.00 | 15.75 | 15.60 | 15.36 | 20.15 |
| La (mm) | 18.5 | 18.2 | 18.5 | 19.2 | 20.2 | 24.1 |
| Ha (mm) | 13.1 | 14.1 | 12.7 | 11.3 | 13.3 | 19.5 |
| max $L_k$ | 10 | 8 | 9 | 12 | 16 | 13 |
| Number of layers N | 8 | 7 | 7 | 8 | 12 | 12 |

Tests and Comparative Tests
Performance in Rotation on the Rim

The performance of each tyre in rotation on the rim was tested. In fact in order for the tyre to be able to transfer all the forces exerted by the engine of the vehicle to the ground, and for the endurance performance of the bottom region of the tyre to be guaranteed, it is preferable that the rotation of the tyre on the rim is as low as possible.

Therefore the equivalent coefficient of friction for the road is measured, which corresponds to the coefficient of friction from which we begin to see a rotation on the rim of the tyre at low load and at high load.

At low load, a vehicle is used with two tyres to be tested at a pressure of 0.5 bar. Then on tarmac, a weight of equal mass is then towed, here 2.6 tonnes per tyre.

At high load, a vehicle is used with two tyres to be tested at a pressure of 1.6 bar. Then on tarmac, a weight of equal mass is then towed, here 6 tonnes per tyre.

A load cell is placed between the weight to be towed and the vehicle, allowing measurement of the force F expressed in kg exerted by the vehicle on the weight to be towed when the tyre begins to turn relative to the rim. Thus for a force F=500 kg exerted to cause the tyre to turn relative to the rim, the maximum force towed (Fmax) before an unacceptable extent of tyre rotation on the rim is measured. As a function of the force measured, tyres are classed from 1 to 5, wherein 5 indicates a tyre with a high rotation on the rim and 1 indicates a tyre with the lowest rotation on the rim.

The results of these tests are summarised in table 12 below for a bead core of the prior art TPC, a comparative bead core TPFR=C, and the bead cores of the first variant of the first embodiment with an angle α equal to 0° designated 52_A0 and an angle α equal to 5°, designated 52_A5.

TABLE 12

| Bead core | TPC | TPFR_C | 52_A0 | 52_A5 |
|---|---|---|---|---|
| angle α | 0 | 0 | 0 | 5 |
| | | Rotation on the rim | | |
| Low load, P = 0.5 bar | 1 | 2 | 1 | 1 |
| High load, P = 1.6 bar | 2 | 2 | 1 | 1 |

It is considered that classifications 1 and 2 reflect a low rotation on the rim, and hence the corresponding tyres fulfil the required criterion of performance of rotation on the rim. It is noted that the tyres comprising bead cores 52_A0 and 52_A5 according to the invention have a classification of 1 at low load and a classification at 1 at high load, compared with the tyre of the prior art comprising the bead core TPC and the tyre comprising the comparative bead core TPFR_C.

Thus the tyres according to the invention have a low rotation on the rim, thus proving their response to the problem of disorganisation of the geometry of the bead court during curing.

Gain in Clamping Pressure and Rotation on the Rim as a Function of Angle α

The mean clamping pressure of each bead on the seat is measured by sensors which measure pressure from the interior of the rim seat towards the outside in the direction P forming an angle α with the axial direction, i.e. on the rim flange.

The results of these tests are collated in table 13 below.

TABLE 13

| Bead core | TPC | TPFR_C | 52_A0 | 52_A5 |
|---|---|---|---|---|
| Gain in clamping pressure | -- | - | + | ++ |

It is found that tyres comprising the bead cores 52_A0 and 52_A5 according to the invention show an improvement in their performance in clamping pressure relative to the tyre of the prior art comprising the bead core TPC, which has a much smaller contact area with the seat (14.4 mm vs 18.5 mm for bead core 52), and also relative to the tyre comprising the comparative bead core TPFR_C with a much greater contact area with the seat (16.7 mm). Thus the distribution of area of clamping pressure on the rim seat and hence the performance in rotation on the rim under the effect of high torque levels are improved. Also, a good positioning of the pressure maximum in the centre of the rim seat is ensured, and hence the performance in resistance to detachment of the tyre from the rim flange, caused by the lifting of the bead core on the axially outer side of the tyre.

The invention is not limited to the above-described embodiments.

The characteristics of the various embodiments described above may be combined insofar as they are mutually compatible.

The invention claimed is:

1. A bead core for a tire which is substantially rotationally symmetrical about an axis, the bead core comprising a plurality of windings of at least one metallic wire with diameter d arranged next to one another in a direction P forming an angle $\alpha$ with an axial direction in a radial sectional half-plane R, on N layers superposed on one another in a radial direction, wherein $\alpha$ ranges from 0° to 10°, wherein, in the sectional half-plane R, the windings of the bead core form a structure consisting of a base structure and a cap structure, where a radially inner base structure is directly in contact in the radial direction with a radially outer cap structure, wherein the base structure of I layers Ci superposed on one another in the radial direction, wherein I is odd and I≥3, comprises:

the radially innermost layer $C_1$ and the radially outermost layer $C_I$ comprising L windings, wherein i is an integral number ranging from 1 to I−2, $L_i = L_{i+2}$ and $|L_i - L_{i+1}| = 1$, wherein $L_i$ is the number of windings of the layer Ci and $Max(L_i) = L$ with:

when i is odd, each axially outermost winding of the layers Ci is arranged in contact with a first outer side, which is a straight line parallel to the radial direction and tangent to the axially outermost winding of the layer $C_1$ in the radial sectional half-plane R, and when i is even, the axially outermost winding of the layers Ci is arranged in contact with the two axially outermost windings of the immediately lower layer, wherein the cap structure of J layers Cj superposed on one another in the radial direction comprises:

the layer $C_{I+1}$ of L−1 windings superposed on layer $C_I$ of the base structure in the radial direction and the axially outermost winding being in contact with the two axially outermost windings of the immediately lower layer, and or when j is an integral number between 1 and J, the layer $C_{I+j}$ is such that:

when j is even, $L_{I+j} = L_{I+(j-1)}$, when j is odd, $L_{I+j} = L - (j+1)/2$, such that when j is odd, the layer $C_{I+j}$ is formed from $L_{I+j}$ windings and the axially outermost winding is arranged in contact with the two axially outermost windings of the immediately lower layer, and when j is even, the layer $C_{I+j}$ comprises $L_{I+j}$ windings arranged next to one another in the direction P from the first outer side, or when j ranges from 1 to J, the layer $C_{I+j}$ is such that: $L_{I+j} = L - j$, wherein a product of the diameter d times L ranges from 13.0 mm to 25.0 mm, wherein N, I and J are integral numbers not equal to zero, such that N=I+J is less than or equal to 16, and wherein a radially outermost layer of the cap structure has less windings than any layer in the base structure.

2. The bead core according to claim 1, wherein the product of the diameter d times L is less than or equal to 24.5 mm.

3. The bead core according to claim 1, wherein the product of the diameter d times L is greater than or equal to 14.5 mm.

4. The bead core according to claim 1, wherein the angle $\alpha$ is less than or equal to 8°.

5. The bead core according to claim 1, wherein the angle $\alpha$ is greater than or equal to 3°.

6. The bead core according to claim 1, wherein the diameter d ranges from 0.95 mm to 3.00 mm.

7. The bead core according to claim 1, wherein $max(L_k) = max(L_i) = L$ is strictly greater than N, with $C_k$ being a layer of the bead core selected from N layers, and $L_k$ is the number of windings of each layer $C_k$, k being an integral number between 1 and N.

8. The bead core according to claim 1, wherein N ranges from 7 to 16.

9. The bead core according to claim 1, wherein 1 ranges from 5 to 13.

10. The bead core according to claim 1, wherein J ranges from 2 to 3.

11. A method for manufacture of a bead core for a tire which is substantially rotationally symmetrical about an axis, the bead core comprising a plurality of windings of at least one wire with diameter d arranged next to one another in a direction P forming an angle $\alpha$ with an axial direction in a radial sectional half-plane R, on N layers superposed on one another in a radial direction, the method comprising:

placing a winding in contact with a laying surface of a channel at a radially inner end and unwinding the winding toward a first outer side, which is a straight line parallel to the radial direction and tangent to an outermost winding of the layer, in order to form the layer $C_1$ such that a product of the diameter d times L is strictly less than 25.0 mm;

superposing I layers Ci on one another in the radial direction, wherein I is odd and I≥3, so as to form a base structure in the sectional half-plane R such that the radially innermost layer $C_1$ and the radially outermost layer $C_I$ comprise L windings, wherein i is an integral number ranging from 1 to I−2, $L_i = L_{i+2}$ and $|L_i - L_{i+1}| = 1$, wherein $L_i$ is the number of windings of the layer Ci and $Max(L_i) = L$ with:

when i is odd, each axially outermost winding of the layers Ci is arranged in contact with the first outer side, which is a straight line parallel to the radial direction and tangent to the axially outermost winding of the layer $C_1$ in the radial sectional half-plane R, and when i is even, the axially outermost winding of the layers Ci is arranged in contact with the two axially outermost windings of the immediately lower layer;

superposing J layers Cj on one another in the radial direction so as to form a cap structure in the sectional half-plane R such that:

the layer $C_{I+1}$ of L−1 windings superposed on layer $C_I$ of the base structure in the radial direction, and or when j is an integral number between 1 and J, the layer $C_{I+j}$ is such that:

when j is even, $L_{I+j} = L_{I+(j-1)}$, when j is odd, $L_{I+j} = L - (j+1)/2$, such that when j is odd, the layer $C_{I+j}$ is formed from $L_{I+j}$ windings and the axially outermost winding is arranged in contact with the two axially outermost windings of the immediately lower layer, and when j is even, the layer $C_{I+j}$ comprises $L_{I+j}$ windings arranged next to one another in the direction P from the first outer side, or when j ranges from 1 to J, the layer $C_{I+j}$ is such that: $L_{I+j} = L - j$, wherein N, I and J are integral numbers not equal to zero, such that N=I+J is less than or equal to 16, and wherein a radially outermost layer of the cap structure has less windings than any layer in the base structure.

12. The method according to claim 11, wherein the bead core is covered with at least one fabric comprising filamentary elements comprising at least one multifilament strand comprising several monofilaments, each made up of a material selected from the group consisting of a polyester, a polyamide, a polyketone, a polyurethane, a natural fiber, a mineral fiber, and an assembly of these materials.

13. A tire for an agricultural or forestry vehicle comprising:
   at least one bead comprising a bead core according to claim 1; and
   a carcass reinforcement comprising at least one carcass ply anchored in each bead by a return around the bead core.

14. The tire according to claim 13, wherein the carcass reinforcement consists of a single carcass ply anchored in each bead by a return around the bead core.

* * * * *